(12) United States Patent
Pillet et al.

(10) Patent No.: US 11,243,307 B2
(45) Date of Patent: Feb. 8, 2022

(54) METHOD FOR PROCESSING A SIGNAL FROM A COHERENT LIDAR IN ORDER TO REDUCE NOISE AND RELATED LIDAR SYSTEM

(71) Applicant: THALES, Courbevoie (FR)

(72) Inventors: Grégoire Pillet, Elancourt (FR); Patrick Feneyrou, Igny (FR)

(73) Assignee: THALES, Courbevoie (FR)

( * ) Notice: Subject to any disclaimer, the term of this patent is extended or adjusted under 35 U.S.C. 154(b) by 337 days.

(21) Appl. No.: 16/472,890

(22) PCT Filed: Dec. 28, 2017

(86) PCT No.: PCT/EP2017/084754
§ 371 (c)(1),
(2) Date: Jun. 23, 2019

(87) PCT Pub. No.: WO2018/122339
PCT Pub. Date: Jul. 5, 2018

(65) Prior Publication Data
US 2019/0331796 A1 Oct. 31, 2019

(30) Foreign Application Priority Data

Dec. 27, 2016 (FR) ...................................... 1601875

(51) Int. Cl.
*G01C 3/08* (2006.01)
*G01S 17/34* (2020.01)
(Continued)

(52) U.S. Cl.
CPC ............ *G01S 17/34* (2020.01); *G01S 7/4818* (2013.01); *G01S 7/4913* (2013.01); *G01S 7/4915* (2013.01)

(58) Field of Classification Search
CPC ..... G01S 7/4818; G01S 7/4913; G01S 7/4915
See application file for complete search history.

(56) References Cited

U.S. PATENT DOCUMENTS 7,170,440 B1 * 1/2007 Beckner ................. G01S 7/024
342/118
2008/0018881 A1 1/2008 Hui et al.
2015/0293211 A1 10/2015 Schulz et al.

FOREIGN PATENT DOCUMENTS

EP 2730947 A1 * 5/2014

OTHER PUBLICATIONS

Amzajerdian, et al., "Lidar systems for precision navigation and safe landing on planetary bodies", Proc. SPIE, International Symposium on Photoelectronic Detection and Imaging 2011: Laser Sensing and Imaging; and Biological and Medical Applications of Photonics Sensing and Imaging, vol. 8192, No. 1, pp. 1-7, Jun. 9, 2011.

(Continued)

*Primary Examiner* — Mark Hellner
(74) *Attorney, Agent, or Firm* — BakerHostetler

(57) ABSTRACT

A method for processing a signal from a coherent lidar includes a coherent source, the method comprising steps consisting of: generating a first beat signal and a second beat signal, using respectively a first detection assembly and a second detection assembly for a plurality of n time intervals, determining n respective values of spectral density using a transform in the frequency domain of the cross-correlation between the first and second beat signals, determining a mean value of the spectral density using said n values of spectral density, determining a piece of location information on the target using the mean value of said spectral density.

9 Claims, 13 Drawing Sheets

(51) Int. Cl.
    *G01S 7/481*         (2006.01)
    *G01S 7/4913*       (2020.01)
    *G01S 7/4915*       (2020.01)

(56) References Cited

OTHER PUBLICATIONS

Adany, et al., "Chirped Lidar Using Simplified Homodyne Detection", Journal of Lightwave Technology, vol. 27, Issue: 16, pp. 3351-3357, Aug. 15, 2009.

Abdelazim, et al., "Development and Operational Analysis of an All-Fiber Coherent Doppler Lidar System for Wind Sensing and Aerosol Profiling", IEEE Transactions on Geoscience and Remote Sensing, vol. 53, No. 12, pp. 3495-6506, Dec. 1, 2015.

* cited by examiner

METHOD FOR PROCESSING A SIGNAL FROM A COHERENT LIDAR IN ORDER TO REDUCE NOISE AND RELATED LIDAR SYSTEM

CROSS-REFERENCE TO RELATED APPLICATIONS

This application is a National Stage of International patent application PCT/EP2017/084754, filed on Dec. 28, 2017, which claims priority to foreign French patent application No. FR 1601875, filed on Dec. 27, 2016, the disclosures of which are incorporated by reference in their entirety.

FIELD OF THE INVENTION

The invention relates to the field of coherent lidars.

BACKGROUND

The principle of a coherent lidar is well-known in the prior art and illustrated in FIG. 1. A coherent lidar comprises a coherent source L, typically a laser, that emits a coherent light wave (IR, visible or near-UV domain), an emitting device DE that allows a volume of space to be illuminated, and a receiving device DR, which collects a fraction of the light wave backscattered by a target T. The Doppler frequency shift $v_{Dop}$ of the backscattered wave depends on the radial velocity v of the target T:

$v_{Dop}=2v/\lambda$ $\lambda$ wavelength of the laser

On reception, the received backscattered light wave Sig of signal frequency fs and one portion of the emitted wave $S_{OL}$ called the "OL" wave (for "oscillateur local" French for local oscillator), which has a local-oscillator frequency $f_{OL}$, are mixed. The interference of these two waves is detected by a photodetector D, and the electrical signal output from the detector has an oscillating term named the beat signal Sb, in addition to terms proportional to the received power and to the local-oscillator power. A processing unit UT digitizes this signal and extracts therefrom information on the location of the target T. This target location information is preferably information on the velocity v, and/or information on position (with one particular emitted signal described below), or even information on presence and/or vibration.

Preferably, the processing unit UT electronically filters the beat signal Sb in a narrow band centered on the zero frequency.

In coherent lidars, the emitting and receiving devices preferably use the same optic (monostatic lidar), such as illustrated in FIG. 2. This feature allows a good mechanical stability to be obtained and decreases the influence of long-distance atmospheric turbulence, the propagation paths of the incident and backscattered waves being coincident.

The optical signal to be emitted is amplified by an amplifier EDFA, then transported in a single-mode optical fiber FM for emission. The emission and reception channels use the same optic O and are separated using a circulator C. This optical signal may optionally be frequency shifted, for example using an acousto-optical modulator that is preferably positioned before the amplifier EDFA but that may also be positioned on the path of the local oscillator. A delay line LR allows the optical paths of the local oscillator and of the emission signal to be equalized so as allow imperfections in the optical components placed after the amplifier EDFA (cross talk of the circulator C, imperfections in the antireflection treatments of the emission/reception optic O, etc.) to be filtered in the RF domain.

The beat signal contains a component of interest S and noise B:

$Sb=S+B$.

Once detected, it is digitized at a sampling frequency. In order to extract velocity information, a transform, typically a Fourier transform, of the digitized beat signal is computed in the frequency domain and in a given time interval, then the spectral power density (SPD) corresponding to the norm (modulus squared) of this transform is determined.

$SPD=|FT[S+B]|^2$

The signal of interest consists of a peak P (illustrated in FIGS. 3a-3e). The SPD also has a noise "floor" that corresponds, for a correctly dimensioned lidar, to photonic shot noise (noise related to the statistical nature of the arrival of the detected photons, also said to be shot noise related to the power of the local oscillator. The signal generated by the backscattered target being very weak with respect to the local-oscillator signal, only the photonic shot noise of the latter is a factor).

The photonic shot noise Bph may be expressed:

$Bph=2.e.\eta.Popt.BA$

Where
e is the charge on the electron, $\eta$ is the efficiency of the detector, Popt is the optical power incident on the detector and BA is the band of analysis of the spectral power density, typically comprised between 0.1 Hz and 100 MHz depending on the type of detector.

This noise when expressed in the spectral domain, has a random variation and:
a baseline corresponding to an average or expected value BO,
a variance V that limits the sensitivity of the lidar (which is related to the ability of the system to detect the one or more frequency peaks).

In order to achieve a better readability given the dynamic range accessible to the lidar, a spectral density SPDN normalized by the average of the noise spectral power density is computed and represented on a logarithmic scale:

$$SPDN = \frac{|FT[S+B]|^2}{<|FT[B]|^2>} = \frac{|FT[S+B]|^2}{B0}$$

Conventionally, two quantities characteristic of the noise are defined:
signal-to-noise ratio (SNR) defined as the power of the peak P over the variance V of the noise:

$SNR=P/V$ the contrast C of the peak, defined as the value of the peak over the average of the noise $C=P/B0$ In order to decrease the noise, n computations of SPD (or SPDN) are carried out in n time intervals ti and an average taken. Because of the random character of the noise, it is known that calculating an average over n SPD values allows the variance V of the noise to be decreased, but not its expected value (average value).

The variation in the normalized spectral density SPDN as a function of the number n of values used to compute the averages is illustrated in FIGS. 3a-3e. FIGS. 3a, 3b, 3c 3d and 3e correspond to n=1, n=2, n=5, n=10 and n=20, respectively. The peak P gradually emerges from the noise. The variance V of the noise also decreases, but not its average value. Therefore, the SNR is proportional to n whereas the contrast remains constant.

With the prior-art processing described above, when n increases the variance V decreases and therefore the SNR increases, this improving detection performance, whereas the expected value, which is independent of n, does not decrease, and the contrast is not improved by the processing.

Specifically, the samples of a Fourier transform are described by a centered complex random variable. A periodgram (elementary spectral power density) therefore has an exponentially decaying variation $\chi^2$-distribution of order 2) and the accumulation of n independent periodgrams is therefore described by a $\chi^2$-distribution of order 2n (the cumulative distribution function of which is an incomplete gamma function of order 2n). The expected value of the $\chi^2$-distribution of order 2n is 2n and its variance is 4n.

By averaging in power the n periodgrams (the accumulation is divided by n and therefore each spectral power density by n) the variance of the noise is divided by $n^2$. The variance in the average power of the n spectral power densities SPDi is therefore proportional to 1/n (or the standard deviation is proportional to 1/sqrt(n)) but its expected value is independent of n.

One way of limiting photonic shot noise is to limit the power of the local oscillator but this also decreases the sensitivity of the lidar, because decreasing the power also decreases the intensity of the peaks. Furthermore, signal-to-noise ratio is independent of the power of the local oscillator since the power of the beat signal is itself proportional to the power of the local oscillator.

From the final spectral power density, the one or more frequencies corresponding to the one or more peaks are determined, and information on the axial velocity v of the target and optionally information on the distance d of the target (see frequency modulation below) are deduced therefrom in a conventional way.

It is known in the prior art to use balanced detection to remove the intensity noise $B_{OL}$ of the coherent source. This noise is a result of spontaneous emission and of exterior disruptions to the laser cavity. The variance in this noise is proportional to the square of the power of the local oscillator $P_{OL}$:

$$\langle i_{RIN}^2 \rangle = \rho^2 \int_B 10^{RIN(f)/10} P_{OL}^2 df$$

To do this, a balanced detector D formed from two detectors PD1 and PD2 such as illustrated in FIG. 4 is used. The signals $S_{OL}$ and Sig are distributed to the two detectors in the way illustrated in FIG. 4, and the difference between the intensities received by the two detectors is determined:

$$I_{PD_1} = \frac{\eta}{4}(Sig + S_{OL} + B_{OL})^2 \approx$$

$$\frac{\eta}{4}(Sig^2 + S_{OL}^2 + B_{OL}^2 + 2Sig.S_{OL} + 2Sig.B_{OL} + 2.S_{OL}.B_{OL})$$

-continued
$$I_{PD_2} = \frac{\eta}{4}(Sig - S_{ol} - B_{ol})^2 \approx$$

$$\frac{\eta}{4}(Sig^2 + S_{OL}^2 + B_{OL}^2 - 2Sig.S_{OL} + 2Sig.B_{OL} + 2.S_{OL}.B_{OL})$$

Where $\eta$ is the efficiency of the detector.
The intensity I is computed:

$I=I_{PD1}-I_{PD2}=\eta(Sig. S_{OL}+Sig. B_{OL})$

In this way the influence of the intensity noise of the laser is decreased. Since the latter is weaker than the signal $S_{OL}$ associated with the local oscillator, the product $Sig.B_{OL}$ is negligible compared to $Sig.S_{OL}$. The beat $Sig.S_{OL}$ is thus extracted.

This type of balanced detector requires both the sensitivity of the two photodiodes and the degree of coupling of the coupler that allows the intensity to be split into two channels to be precisely balanced. It may be used in any type of lidar, and more particularly in any type of coherent lidar, but it decreases only the intensity noise of the source and not the photonic shot noise resulting from the detection of the local oscillator.

A prior-art solution is also known for lidar range-finding/velocimetry, this solution consisting in producing a lidar system employing frequency modulation. This technique, which is conventional in radar, is of particular interest currently on account of the progress that has been made with fiber-laser sources. By virtue of the frequency modulation, a time/frequency analysis allows the distance d to be extracted (the delay To of the signal backscattered by the target with respect to the local oscillator is dependent on the distance d) as well as the velocity v. This type of lidar also allows a laser-anemometry function to be performed.

An example of an optical architecture of a lidar employing frequency modulation using a balanced detector D (comprising a detector PD1 and a detector PD2) is illustrated in FIG. 5. The coherent source is frequency modulated so that the frequency of the local oscillator $f_{OL}(t)$ is modulated according to a preset function $f_{mod}(t)$ named the waveform, which is controlled by the module WFC, which is synchronized with the processing unit UT. The frequency of the local oscillator may thus be expressed:

$f_{OL}(t)=f0+f_{mod}(t)$ where f0 is the average frequency of the laser L

An example of a coherent lidar employing frequency modulation is described in the document "Lidar systems for precision navigation and safe landing on planetary bodies" Farzin Amzajerdian et al, Proc. SPIE 8192, International Symposium on Photoelectronic Detection and Imaging 2011: Laser Sensing and Imaging; and Biological and Medical Applications of Photonics Sensing and Imaging, 819202 (Aug. 19, 2011). The frequency $f_{OL}$ of the local oscillator is linearly modulated according to two frequency slopes $\alpha_0$ and $\alpha_1$ periodically of period $T_{FO}$. FIG. 6 illustrates the variation over time in the local-oscillator frequency $f_{OL}(t)$ and in the signal frequency fs(t). As illustrated in FIG. 6a, the backscattered signal of frequency $f_s(t)$ is temporally shifted by a time $\tau$ because of the propagation to the measurement zone (target T) and therefore related to the distance d of the target, and is shifted in frequency by a value $v_{Dop}$ because of the Doppler effect with respect to the local-oscillator frequency $f_{OL}(t)$.

The detected beat signal Sb has a positive frequency component fs-$f_{OL}$. FIG. 6b illustrates the variation over time in fs-$f_{OL}$. It may be seen that this frequency difference comprises as a function of time two series of plateaux at characteristic frequencies $v_{\alpha 0}$ and $v_{\alpha 1}$, which are directly related to the distance d of the target and to its radial velocity v by the equations:

$$v_{\alpha_0} = \frac{2v}{\lambda} - \frac{2\alpha_0 D}{c} \text{ and } v_{\alpha_1} = \frac{2v}{\lambda} - \frac{2\alpha_1 D}{c}$$

By measuring these two characteristic frequencies $v_{\alpha 0}$ and $v_{60\ 1}$ of the beat signal Sb, for example by carrying out a Fourier transform thereon, such as described above, d and v are extracted.

Those skilled in the art also know of the coherent-lidar architecture illustrated in FIG. 7, in which the oscillator signal $S_{OL}$ is sampled by virtue of a reflection to a fiber end.

SUMMARY OF THE INVENTION

One aim of the present invention is to mitigate the aforementioned drawbacks by providing a beat-signal-processing method and a specific associated detection architecture that allow photonic shot noise originating from the detection of the local-oscillator signal to be decreased, that are compatible with the use of a balanced detector and that are able to be implemented in any coherent lidar.

One subject of the present invention is a method for processing a signal generated by a coherent lidar comprising a coherent source, the method comprising steps of:
  generating a first beat signal and a second beat signal in a first detection assembly and a second detection assembly, respectively, each beat signal being generated by interference between a local-oscillator signal generated by the coherent source and a signal backscattered by a target illuminated by the lidar, then digitizing these beat signals,
  for a plurality of n time intervals, determining n respective spectral-density values from a transform to the frequency domain of the cross-correlation between the first and second beat signals,
  determining an average value of the spectral density from said n spectral-density values,
  determining target location information from the average value of said spectral density.

According to one embodiment, the step of determining n spectral-density values comprises substeps of:
  determining a first value of a transform to the frequency domain of the first beat signal,
  determining a second value of the conjugate of a transform to the frequency domain of the second beat signal,
  the spectral-density value being determined from the product of the first and second values.

According to one variant, the coherent source is frequency modulated periodically so that the local-oscillator signal has a local-oscillator frequency consisting of the sum of an average value and of a modulation frequency that is generated by modulating the source, the modulation frequency being periodic over a modulation period, and the time intervals are shorter than or equal to the modulation period, the processing method furthermore comprising a step consisting in determining information on the distance of the target from the average value of the spectral density.

Preferably, each modulation period of the modulation frequency comprises n linear portions having n frequency slopes, respectively, n being higher than or equal to 2.

The invention also relates to a coherent-lidar system comprising: a coherent source,
  a device for emitting an optical signal generated by the coherent source and a device for receiving a signal backscattered by a target illuminated by the lidar,
  a first detection assembly and a second detection assembly, which detection assemblies are configured to generate a first beat signal and a second beat signal, respectively, each beat signal being generated by interference between a local-oscillator signal generated by the coherent source and the signal backscattered by the target,
  a processing unit configured to digitize the first and second beat signals, and configured to determine, for a plurality of n time intervals, n spectral-density values corresponding to a transform to the frequency domain of the cross-correlation between the first and second beat signals,
the processing unit furthermore being configured to:
  determine an average value of the spectral density from the n computed spectral-density values, and
  determine target location information from the average value of the spectral density.

According to one embodiment, the coherent-lidar system according to the invention furthermore comprises a modulating device synchronized with the processing unit and configured to frequency modulate periodically the coherent source so that the local-oscillator signal has a local-oscillator frequency consisting of the sum of an average value and of a modulation frequency that is generated by the modulation of the source, the modulation frequency being periodic over a modulation period, each period comprising n linear portions having n frequency slopes, respectively, n being higher than or equal to 2. The processing unit is also configured so that the time intervals ti are shorter than or equal to the modulation period, and to determine information on the distance of the target from the average value of the spectral density.

According to one preferred variant, the first and/or second detection assembly are balanced detectors, each comprising a first detector and a second detector, the first detectors receiving a difference between the local-oscillator signal and the backscattered signal, the second detectors receiving a sum of the local-oscillator signal and of the backscattered signal.

The first and second beat signals are generated from the difference between the intensities received by the first detector and the second detector of the first detection assembly and the first detector and second detector of the second detection assembly, respectively.

Preferably, the first detection assembly and/or the second detection assembly are placed so that the length of the paths followed by each of the signals to said detection assemblies are substantially equal.

BRIEF DESCRIPTION OF THE DRAWINGS

Other features, aims and advantages of the present invention will become apparent on reading the following detailed description with reference to the appended drawings, which are given by way of nonlimiting example, and in which:

FIGS. 3a to 3e illustrate the variation in said power density as a function of the number n of values used to compute the average value.

DETAILED DESCRIPTION

Before describing the invention we will recall certain mathematical concepts known to those skilled in the art and required for a good comprehension of the invention.

The Fourier transform FT of a time-dependent function S(t) is defined, e.g. transform to the frequency domain:

$$FT[S(t)] = \int_{-\infty}^{+\infty} S(t) \cdot \exp(-2i\pi vt) dt$$

The product of convolution of two complex time-dependent functions S1(t) and S2(t) is defined as:

$$S_1 * S_2 = \int_{-\infty}^{+\infty} S_1(\tau) \cdot S^*_2(t-\tau) d\tau \, FT[S_1(t) * S_2(t)] = FT[S_1(t)] \cdot FT[S_2(t)]$$

S being a complex number:

$$S = Re(S) + iIm(S) \text{ and } S^* = Re(S) - iIm(S)$$

The cross-correlation function of $S_1$ and $S_2$ is also defined:

$$C_{S_1 S_2} = S_1(t) \otimes S_2(t) = \int_{-\infty}^{+\infty} S_1(t) \cdot S^*_2(t-\tau) dt = \int_{-\infty}^{+\infty} S_1(t+\tau) \cdot S^*_2(t) dt \quad (1)$$

and its Fourier transform:

$$FT[C_{S_1 S_2}(\tau)] = FT[S_1(t) * S^*_2(-t)] = FT[S_1(t)] \times FT[S^*_2(-t)] = FT[S_1(t)] \times \{FT[S_2(t)]\}^* \quad (2)$$

The correlation function is maximum when $S_1$ and $S_2$ are identical to within a time shift. $C_{S_1 S_2}$ is then maximum for a value of τo corresponding to this shift.

Figure 1:
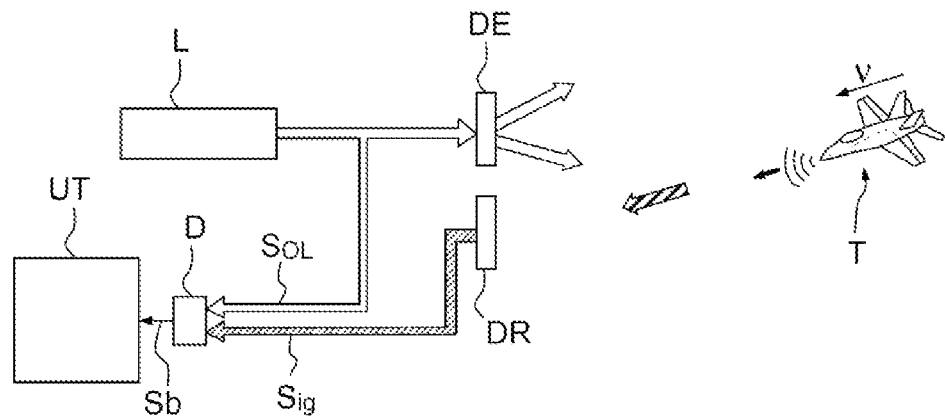
FIG. 1, which has already been referenced, describes the principle of a coherent lidar according to the prior art.
Figure 2:
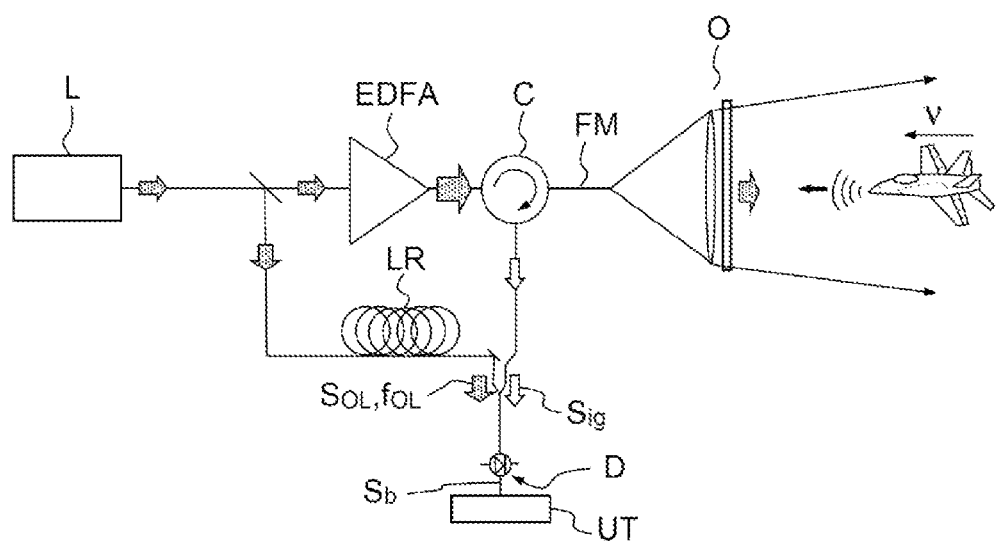
FIG. 2, which is already been referenced, illustrates the architecture of a monostatic lidar.
Figure 3A:
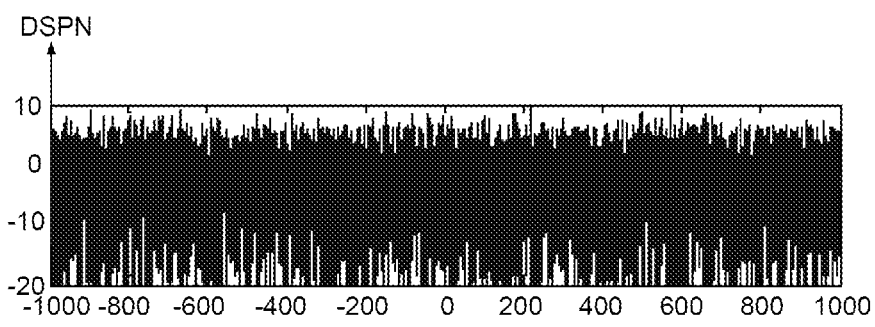
FIGS. 3a to 3e, which have already been referenced, illustrate the power density of the normalized beat signal.
Figure 3B:
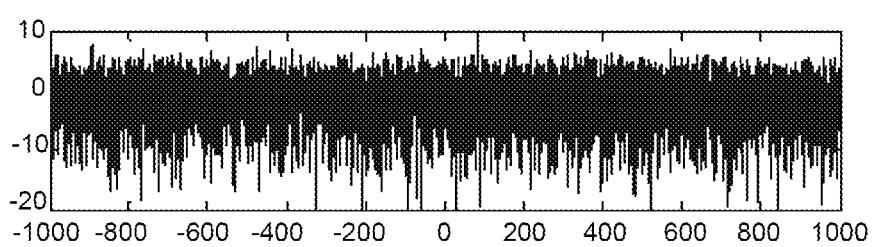
Figure 3C:
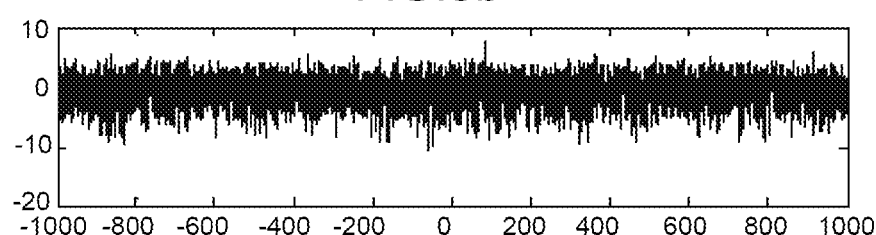
Figure 3D:
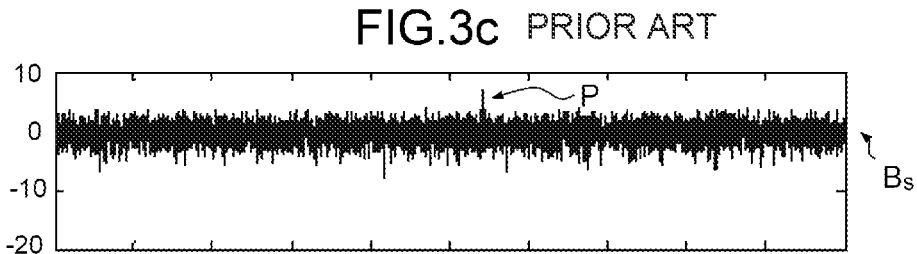
Figure 3E:
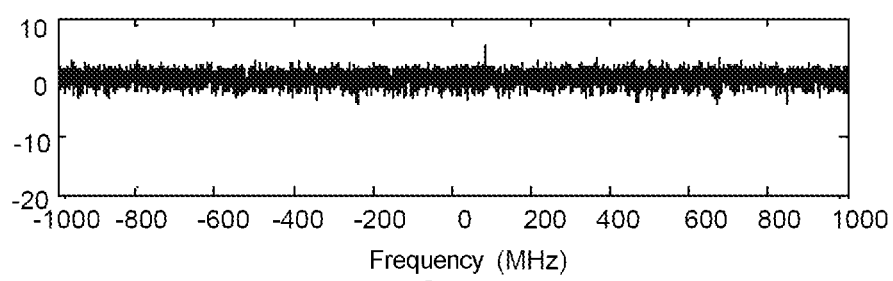
Figure 4:
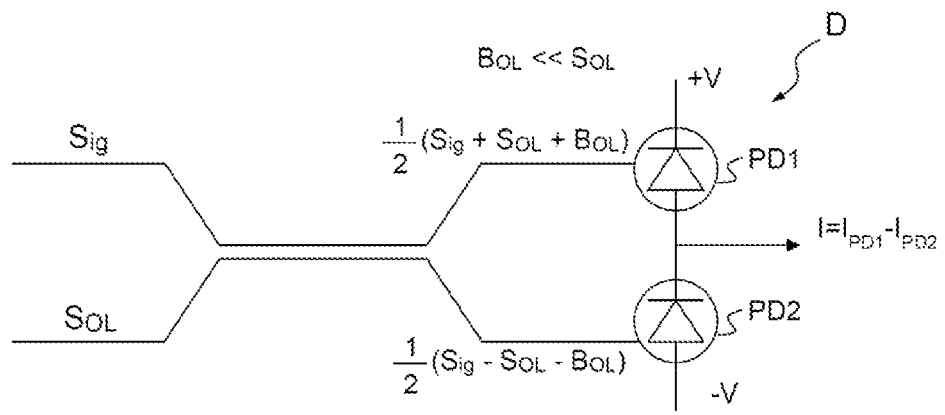
FIG. 4, which has already been referenced, illustrates the principle of balanced detection.
Figure 5:
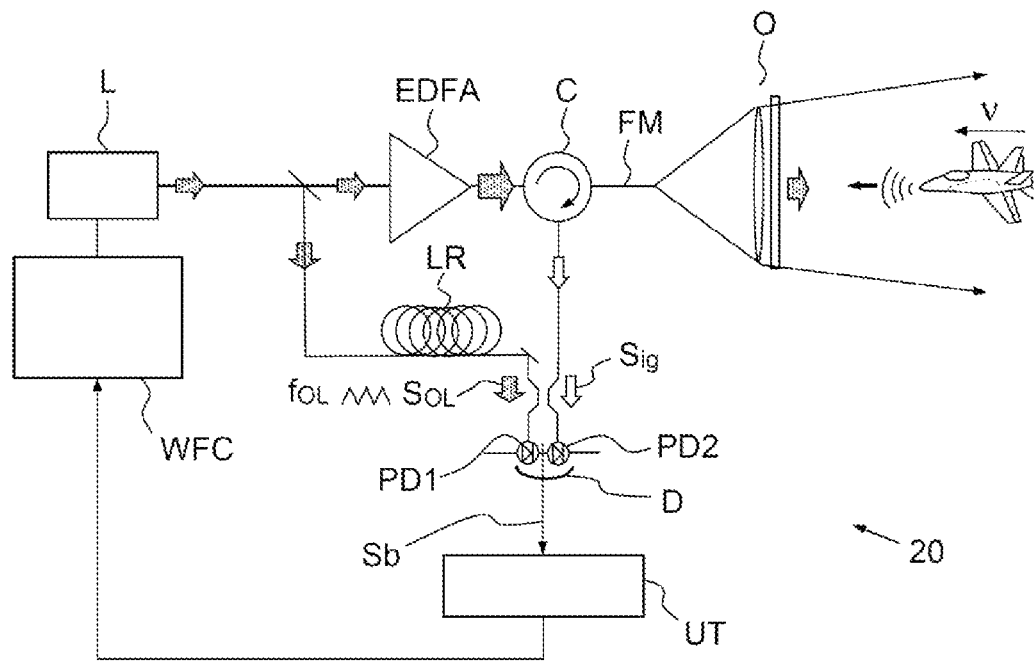
FIG. 5, which has already been referenced, illustrates the optical architecture of a coherent lidar employing frequency modulation.
Figure 6:
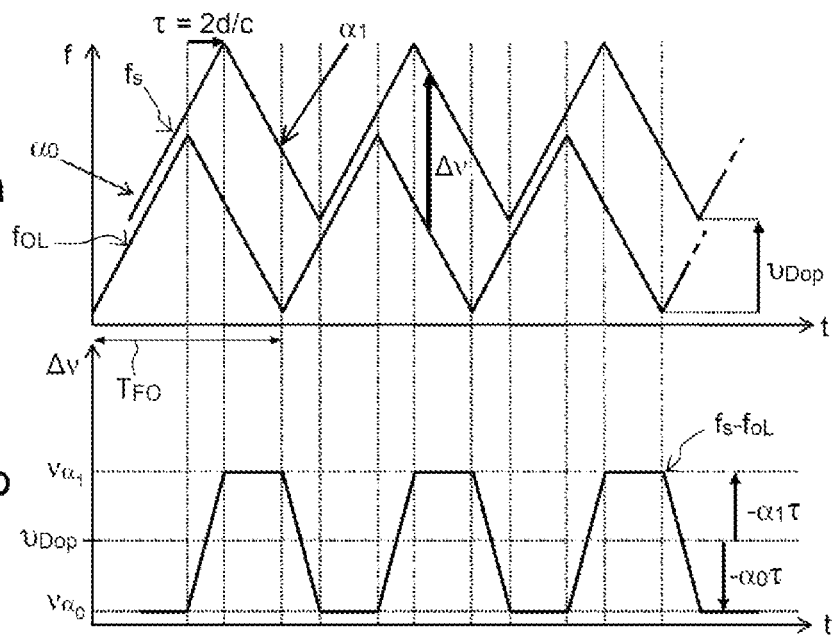
FIG. 6a, which has already been referenced, illustrates the variation over time in the local-oscillator and signal frequencies, and FIG. 6b, which has already been referenced, illustrates the variation over time in the positive component of the beat signal.
Figure 7:
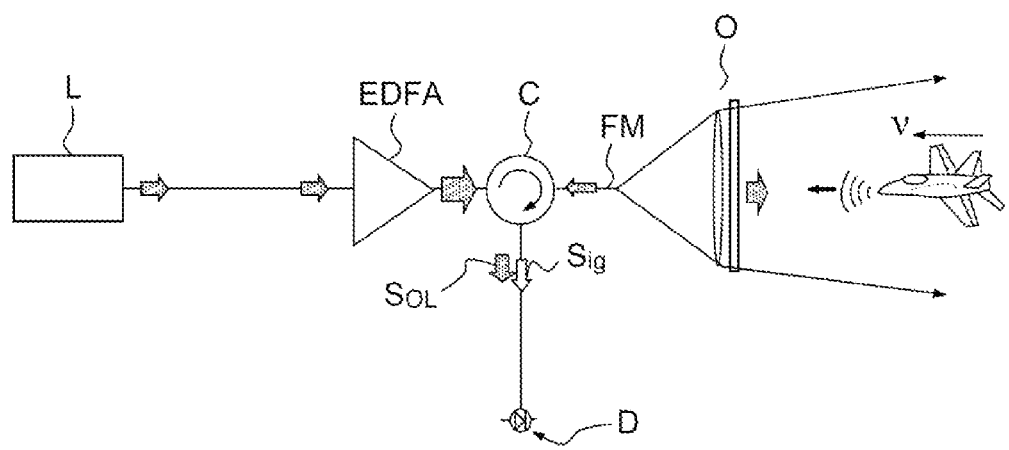
FIG. 7 illustrates another coherent-lidar architecture known to those skilled in the art.
Figure 8:
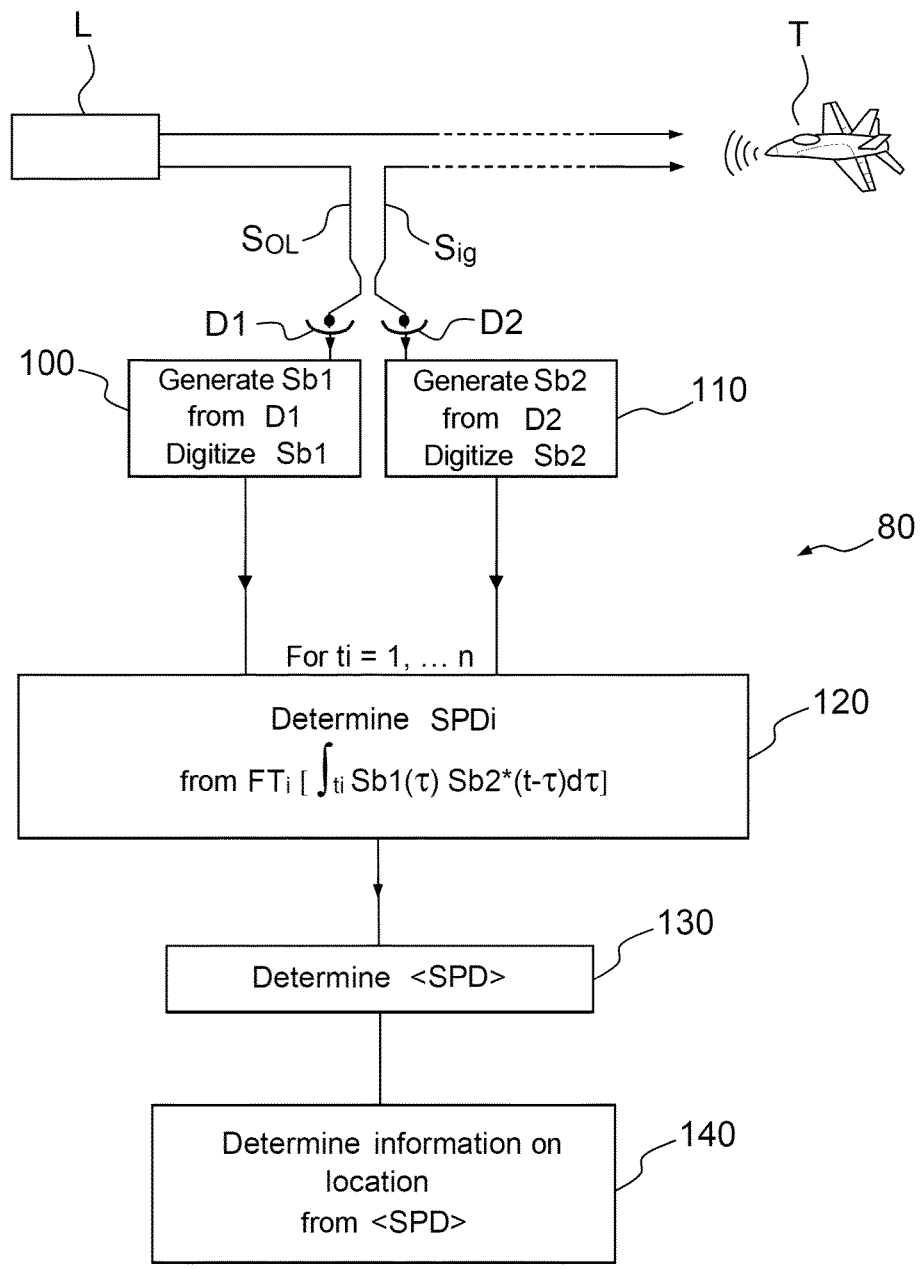
FIG. 8 illustrates the method for processing a signal generated by a coherent lidar according to the invention.

The method 80 for processing a signal generated by a coherent lidar comprising a coherent source L according to the invention is schematically shown in FIG. 8.

The method comprises a step 100 of generating a first beat signal Sb1 using a first detection assembly D1, the beat signal Sb1 being generated by interference between a local oscillator signal $S_{OL}$ generated by the coherent source and a signal Sig backscattered by a target illuminated by the lidar. Next, also in step 100, the signal Sb1 is digitized at a sampling frequency.

Likewise, one step 110 consists in generating a second beat signal Sb2 using a second detection assembly D2, the beat signal Sb2 being generated by interference between a local oscillator signal $S_{OL}$ generated by the coherent source and a signal Sig backscattered by a target illuminated by the lidar. Next, the signal Sb2 is digitized.

To generate Sb1 and Sb2 a fraction of each signal Sig and $S_{OL}$ is directed to the detection assemblies D1 and D2, as illustrated below.

Next, for a plurality of n time intervals ti indexed i, i varying from 1 to n, a step 120 determines n corresponding spectral-density values SPDi, from a transform to the frequency domain of the cross-correlation between the first beat signal Sb1(t) and the second beat signal Sb2(t).

For a given time interval ti, this operation consists in carrying out a transform to the frequency domain of the correlation function $C_{Sb1 Sb2}$ defined by formula (1) in the time interval ti in question.

Typically, a Fourier transform of $C_{Sb1 Sb2}$ such as specified by formula (2) is carried out in the time interval ti in question, i.e. digitally a fast Fourier transform (FFT).

According to one variant, the calculated spectral density SPDi corresponds directly to the frequency transform of the time-dependent beat signals:

$$SPDi = FT[C_{S_1 S_2}(\tau)]$$

Each beat signal Sb1, Sb2 may be decomposed into a signal of interest S1, S2, and a photonic-shot-noise component B1, B2 generated by the corresponding detection D1, D2:

$$Sb1 = S1 + B1 \text{ and } Sb2 = S2 + B2$$

According to another variant, the computed spectral density SPDi corresponds to the noise-normalized spectral density SPDNi:

$$SPDNi = \frac{SPDi}{B0}$$

Next, in a step 130, an average value <SPD> of the spectral density is determined from the n spectral-density values SPDi determined for the time intervals ti.
Preferably, a linear average is taken:

$$\langle SPD \rangle = \frac{1}{n} \sum_i SPDi$$

Lastly, in a step 140, target location information is determined from the average value of said spectral density. This target location information is preferably information on velocity v, and/or information on position (with a particular emitted signal described below), or even information on simple presence and/or on vibration (detection of eigenmodes of vibration of a target, which is not necessarily moving).

With the method 80 according to the invention, rather than computing a norm of an FFT from a single detected signal as in the prior art, a frequency transform is carried out on the correlation of two beat signals generated by two different detectors, this being done for a plurality of time intervals ti.

This signal-processing method, and the associated double detection allows the noise floor to be decreased by averaging, this decrease affecting both the variance and the average value. Specifically, since the noise in each detector is mainly related to the shot noise associated with the power of the local oscillator, the noise in each of the detectors is essentially decorrelated from the noise in the other since it is related to the statistical arrival of photons on each of the detecting assemblies D1 and D2.

In contrast, the signals of interest S1 and S2 are identical. By computing the cross-correlation of the signals generated by the two detectors, the contribution of the noise in average value decreases as a function of the number n of averaged spectral densities.

More precisely, the following is calculated typically for in each time interval ti:

$$FT[S_1+B_1] \times \{FT[S_2+B_2]\}^* = FT[S_1] \times \{FT[S_2]\}^* +$$
$$FT[S_1] \times \{FT[B_2]\}^* + FT[B_1] \times \{FT[S_2]\}^* + FT[B_1] \times \{FT[B_2]\}^*$$
$$FT[S_1+B_1] \times \{FT[S_2+B_2]\}^* =$$
$$FT[S_1 \otimes S_2] + FT[S_1 \otimes B_2 + B_1 \otimes S_2 + B_1 \otimes B_2]$$

S1 and S2 are very highly correlated, because they are generated by the same sources and equal (to within a time shift), whereas the cross-correlations of S1 or S2 with B1 or B2 comprise no significant maximum.

Therefore, after calculation of the average over n reiterations, the average:

$$\langle S_1 \otimes B_2 + B_1 \otimes S_2 + B_1 \otimes B_2 \rangle_n$$

will tend to 0 (in expected value and in variance). Specifically, averaging over n reiterations (n time intervals ti) will cause the above cross products to see their amplitude decreased. In the end only the component of interest corresponding to the Fourier transform of the cross-correlation between S1 and S2 is left.

More precisely, only the positive real part of the product $FT(S1).FT(S2)^*$ is of interest. The negative and imaginary parts also form part of the parasitic terms that decrease with the number of averages.

The decrease in the expected value of the noise (in addition to its variance) facilitates the detection of the peaks of interest because the contrast C with respect to the noise level is greatly increased. A significant increase in the range of the lidar is thus obtained.

According to one preferred variant, practically the operations are carried out digitally by FFT in the time intervals ti, and the following is obtained:

$$SPDi=FFT_{ti}(S1+B1).FFT_{ti}(S2+B2)^* SPDi=$$
$$FFT(S1).FFT(S2)^*+FFT(S1).FFT(B2)^*+FFT(B1).FFT(S2)^*+FFT(B1).FFT(B2)^*$$

Likewise, after an average over n reiterations only the term of interest $FFT(S1).FFT(S2)^*$ preserves a similar amplitude, the other terms seeing their amplitude decreased.

Specifically, if the expected value of the norm squared of the average of the SPDi is computed:

$$E\left[\left|\frac{\sum_{i=1}^{n} SPD_i}{n}\right|^2\right] = \frac{1}{n^2} E\left[\left|\sum_{i=1}^{n} SPD_i\right|^2\right]$$

In this sum, the terms containing the noises B1 and B2 may be written in the following form, on account of the fact that the noises B1 and B2 have a centered complex distribution:

$$E\left[\left|\left(\sum_{i=1}^{n} \frac{\alpha_i \exp(i\phi_i)}{n}\right)\right|^2\right]$$

where $a_i$ and $\phi_i$ are the amplitude and phase of terms containing products of the type $FFT(S1).FFT(B2)^*$ or $FFT(B1).FFT(S2)^*$.

It is possible to show that:

$$E\left[\left|\left(\sum_{i=1}^{n} \frac{\alpha_i \exp(i\phi_i)}{n}\right)\right|^2\right] < \frac{E[|\alpha_i|^2]}{n}$$

This majorant clearly decreases to 0 as a function of n.

Figure 9:
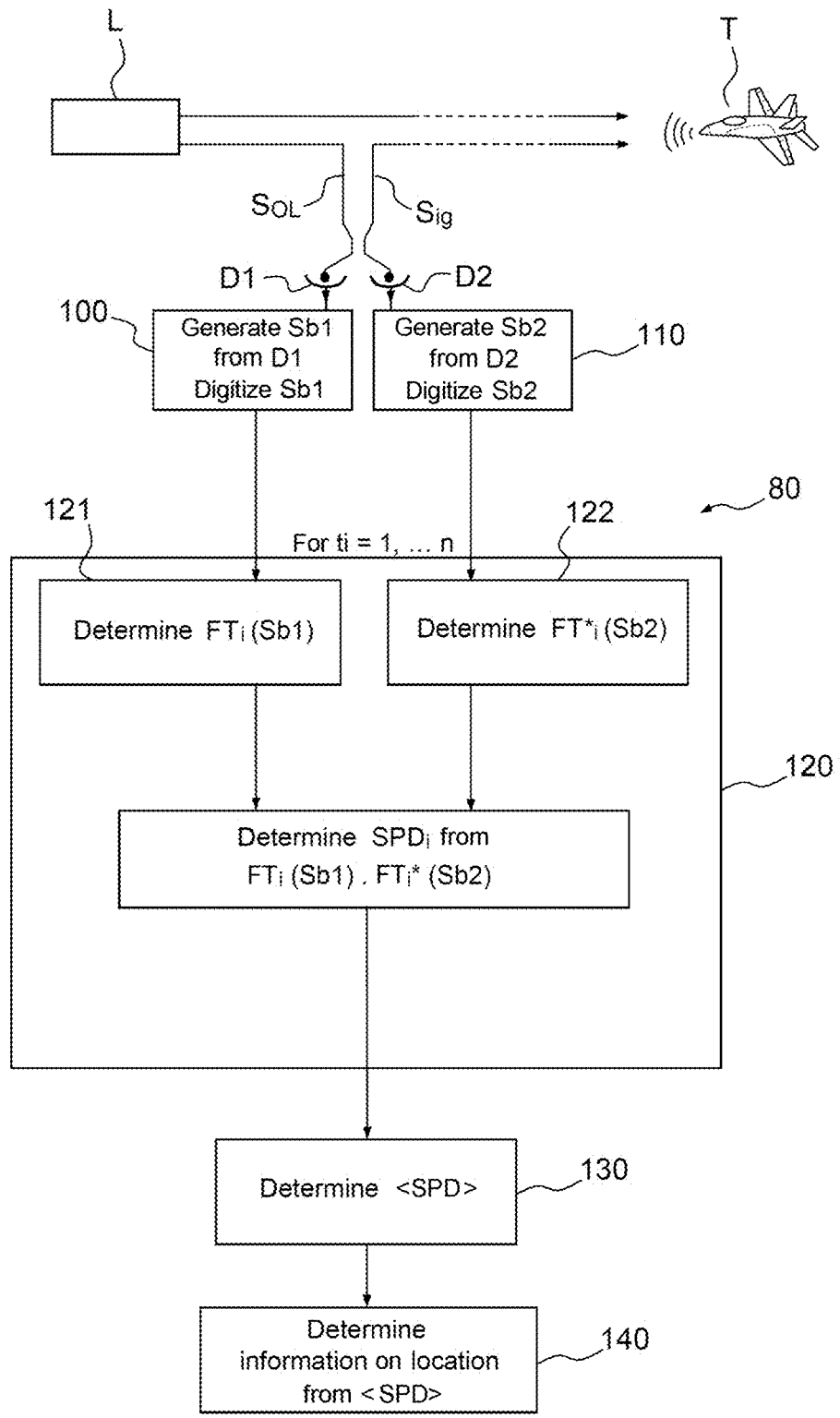
FIG. 9 shows one preferred embodiment of the processing method according to the invention.
Figure 10A:
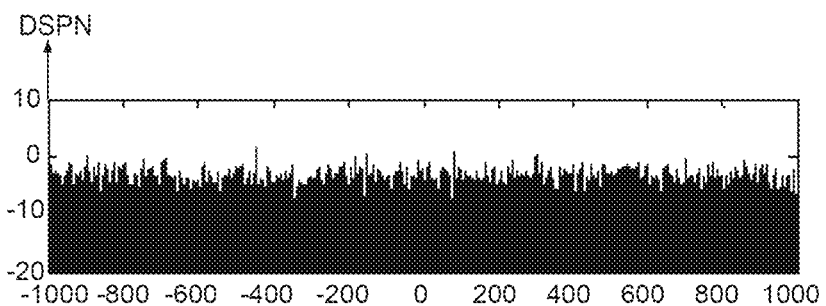
FIGS. 10a to 10e illustrate an example of variation in the normalized spectral density as a function of n, FIGS. 10a, 10b, 10c, 10d and 10e corresponding to n=1, n=2, n=5, n=10 and n=20, respectively.
Figure 10B:
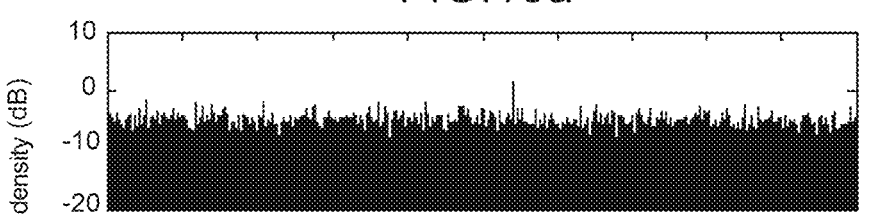
Figure 10C:
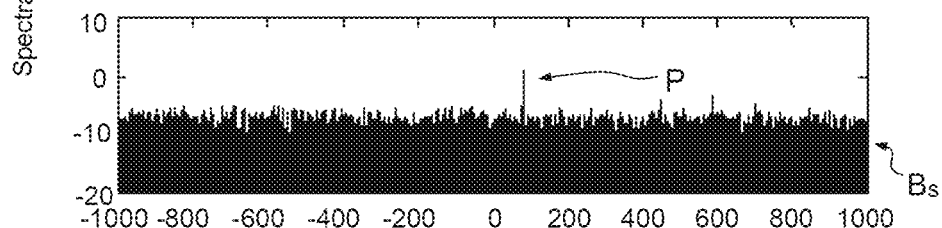
Figure 10D:
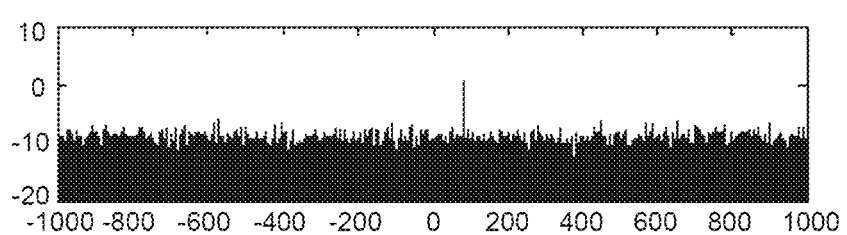
Figure 10E:
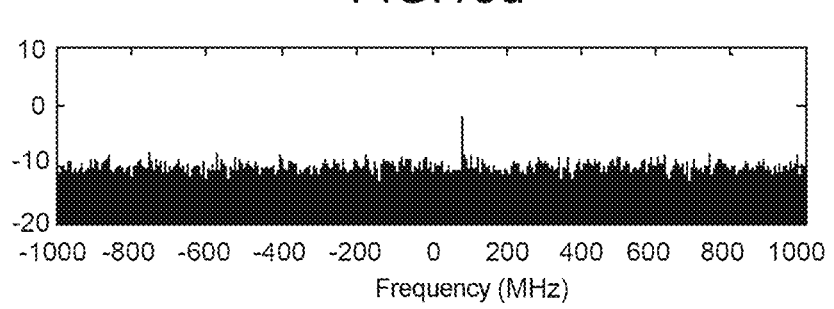

According to one preferred embodiment illustrated in FIG. 9, the step 120 of determining n values of the spectral density SPDi comprises, for each time interval ti, a substep 121 consisting in determining a first value of a transform FTi(Sb1) to the frequency domain of the first beat signal and a substep 122 consisting in determining a second value of the conjugate FTi(Sb2)* of a transform to the frequency domain of the second beat signal, the value of the spectral density being computed from the product of the first and second values.

Specifically, to calculate SPDi, transform to the frequency domain of the cross-correlation between the first and second beat signal, it is possible to either compute the cross-correlation as a function of time, then carry out the frequency transform of the computed function, or to compute the frequency transform of each detected beat signal (or its conjugate) and to take the product thereof. To optimize computational speed, the latter computational method is preferably chosen.

According to one variant, each SPDi is directly equal to said product:

$$SPDi=FTi(Sb1).FTi(Sb2)^*.$$

According to another preferred variant, each SPDi is equal to the product of the Fourier transform normalized by the corresponding noise:

$$SPDNi=FTi(Sb1)/B1.FTi(Sb2)^*/B2.$$

With norm with respect to $B1$ and $B2$

This makes it possible to not have to adapt the signal processing for the exploitation of the SPDNi with respect to that used in the absence of the invention. In particular, the computation of distances and velocity from the SPDNi is then rigorously identical to that used with SNR in a single-detector architecture.

FIG. 10 illustrates an example of variation in the normalized spectral density SPDN as a function of n for a similar case to that of FIG. 3, but using the signal-processing method 80 according to the invention. FIGS. 3a, 3b, 3c, 3d and 3e correspond to n=1, n=2, n=5, n=10 and n=20, respectively. The peak P emerges from the noise, the following behaviors being observed:

The variance of the noise continuously decreases as 1/n (therefore the SNR decreases as 1/n)

The average of the noise decreases as 1/n. Therefore the contrast increases as n.

The signal-processing method 80 is compatible with a lidar employing frequency modulation.

Figure 11A:
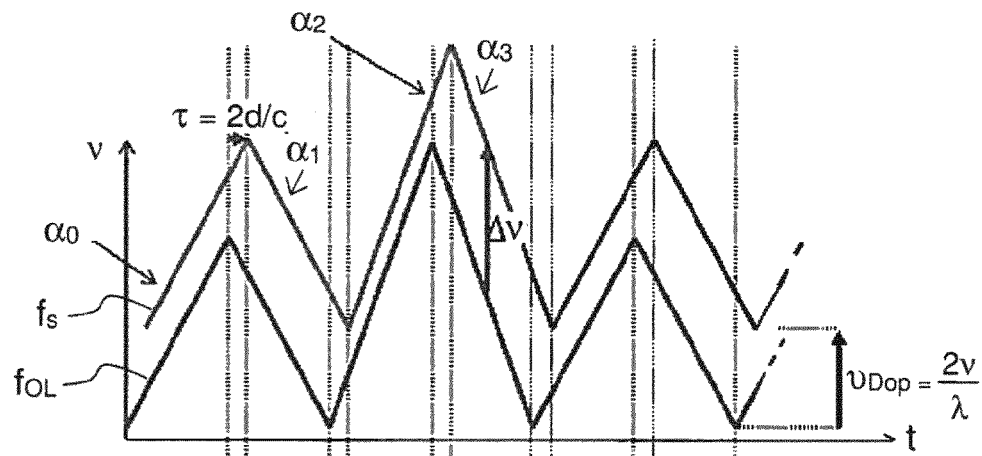
FIG. 11a illustrates the variation over time in the frequencies $f_{OL}(t)$ and $f_s(t)$.
Figure 11B:
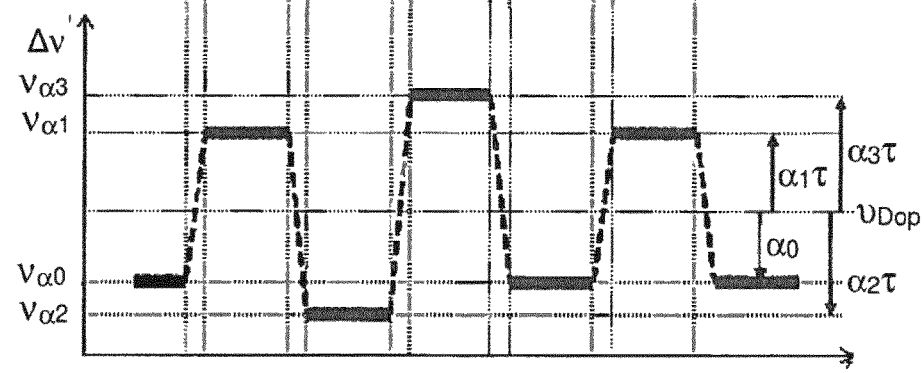
FIG. 11b illustrates the variation over time in $f_s - f_{OL}$ for the 4-slope case.

Thus, according to one embodiment, the coherent source L of the coherent lidar to which the method 80 according to the invention is applied is frequency modulated periodically so that the local-oscillator signal $S_{OL}$ has a local-oscillator frequency $f_{OL}(t)$ consisting of the sum of an average value f0 and of a frequency modulation $f_{mod}(t)$ that is generated by modulating the source, the frequency modulation being periodic over a modulation period $T_{FO}$ (see FIG. 11 below). The time intervals ti are in this case shorter than or equal to the modulation period in order to preserve a given frequency slope during ti.

The processing method 80 furthermore comprises a step consisting in determining information on the distance d of the target from the average value of the spectral density, using conventional prior-art methods. The method 80 allows the sensitivity of detection of the frequency peaks to be increased and therefore the range of the instrument to be increased, Preferably, each period comprises n linear portions having n frequency slopes αi, respectively, n being higher than or equal to 2. It is known in the prior art to use a 2-slope signal.

To remove ambiguities associated with any aliasing, a waveform with 4 frequency slopes α0, α1, α2, α3 is preferably used. Specifically, the determination of 4 characteristic frequencies leads to a system of 4 equations, with 2 unknowns, v and d.

$$v_{\alpha_i} = \frac{2v}{\lambda} - \frac{2\alpha_i D}{c}$$

This allows a redundancy to be obtained and therefore one of the equations to be used to remove ambiguities associated with any spectral aliasing and another to be used as a confidence parameter. This confidence parameter may for example be the residue of the inversion between the frequencies $v_{\alpha i}$ and the distance and radial velocity. This inversion may be obtained using a least-squares technique, optionally an iteratively reweighted least-squares (IRLS) technique.

FIG. 11 a illustrates the variation over time in the frequencies $f_{OL}(t)$ and $f_s(t)$, the average optical frequency f0 of the laser L having been subtracted for greater clarity. FIG. 11 b illustrates the variation over time in fs-$f_{OL}$ for the 4-slope case. It may be seen in FIG. 10b that this variation in frequency over time has 4 plateaux corresponding to 4 characteristic frequencies.

Figure 12:
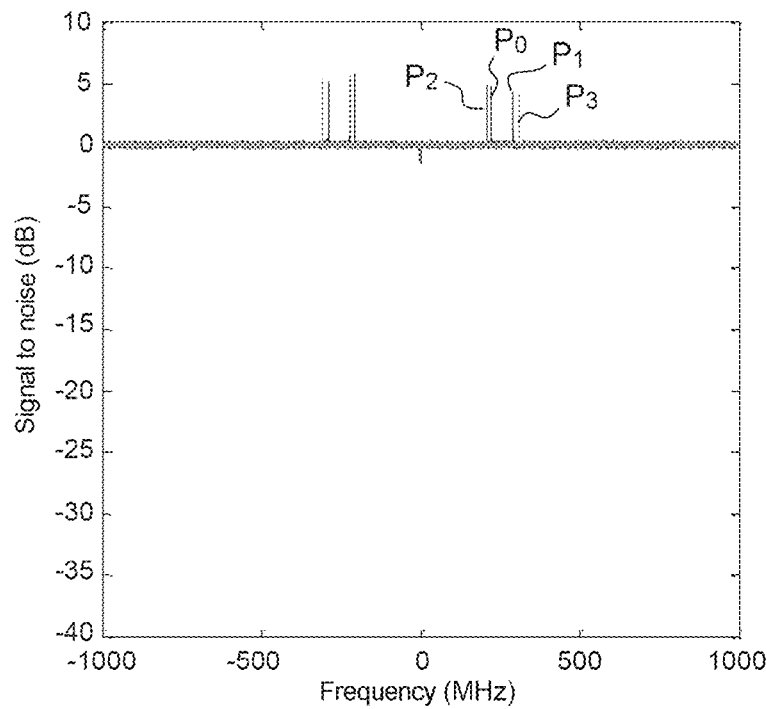
FIG. 12 shows an example of a normalized spectral power density expressed in dB of the beat signal detected by a single detector according to the prior art.

FIG. 12 illustrates the normalized spectral power density SPDN expressed in dB and averaged with n=300 and ti=16.3 µs, of the beat signal detected by a single detector D according to prior art, corresponding to the case of a target located at 2507 m and moving at 200 m/s. The frequency $f_{mod}$ has the following slope values (laser of optical frequency f0=1.55 µm):

α0=2 MHz/µs
α1=−2 MHz/µs
α2=3 MHz/µs
α3=−3 MHz/µs

Four peaks P0, P1, P2 and P3 corresponding to the four characteristic frequencies $v_{\alpha 0}$, $v_{\alpha 1}$, $v_{\alpha 2}$, and $v_{\alpha 3}$ respectively are detected.

These peaks are symmetric because of the real character of the detected beat signal, which generates two components during the computation of the Fourier transforms.

Figure 13:
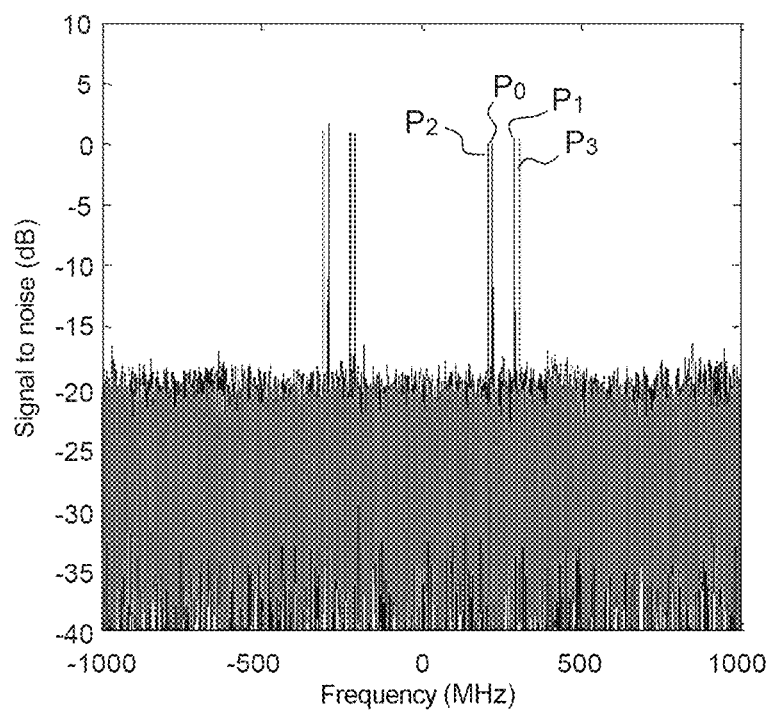
FIG. 13 shows the normalized spectral power density expressed in dB of the beat signal for the same case as FIG. 12, the beat signal being detected by two detection assemblies and the normalized spectral power density calculated with the processing method according to the invention.

FIG. 13 illustrates the normalized power density SPDN expressed in dB and averaged with n=300 and ti=16.3 µs, for the same case as above, but computed with the method 80 according to the invention, i.e. using the Fourier transform of the cross-correlation of the beat signals S1 and S2 detected by two detection assemblies D1 and D2.

By comparison of FIG. 13 and FIG. 12, the following may be noted in this example:

a decrease in the signal peaks. This decrease is related to the division of the signal and of the local oscillator by a factor of 2, because of the need to send a fraction of the signals $S_{OL}$ and Sig (here half) to each detection assembly.

a decrease in the variance V, and therefore in the standard deviation, of the noise floor, which passes in this example from 0.024 to 0.005, i.e. also a decrease of 6 dB powerwise. The signal-to-noise ratio SNR remains identical to the case of FIG. 12.

a large increase in the signal contrast C with respect to the noise floor: in this example it passes from 5.6 dB to 28.8 dB, i.e. an increase of 23.2 dB.

With respect to the computation carried out according to the prior art it is recommended, to implement the method according to the invention 80, to carry out two FFTs instead of one, this slightly increasing the computation time. Practically, the beat signal is digitized in real time as it arrives and the signal-processing computations are also carried out in real time, for a plurality of time intervals ti.

This new processing method 80 (associated with a new detection architecture) allows an improvement in the sensitivity of the lidar to be obtained in particular if the noise floor, and more particularly its baseline, is poorly known, or (this is often the case) if the noise floor varies as a function of time (even on the scale of one modulation period $T_{FO}$).

The method according to the invention is applicable to any coherent-lidar system, such as coherent-lidar systems aiming to detect weak signals, and in particular for the following applications:

long-range range-finding/velocimetry,
altimetry
laser anemometry.

Figure 14:
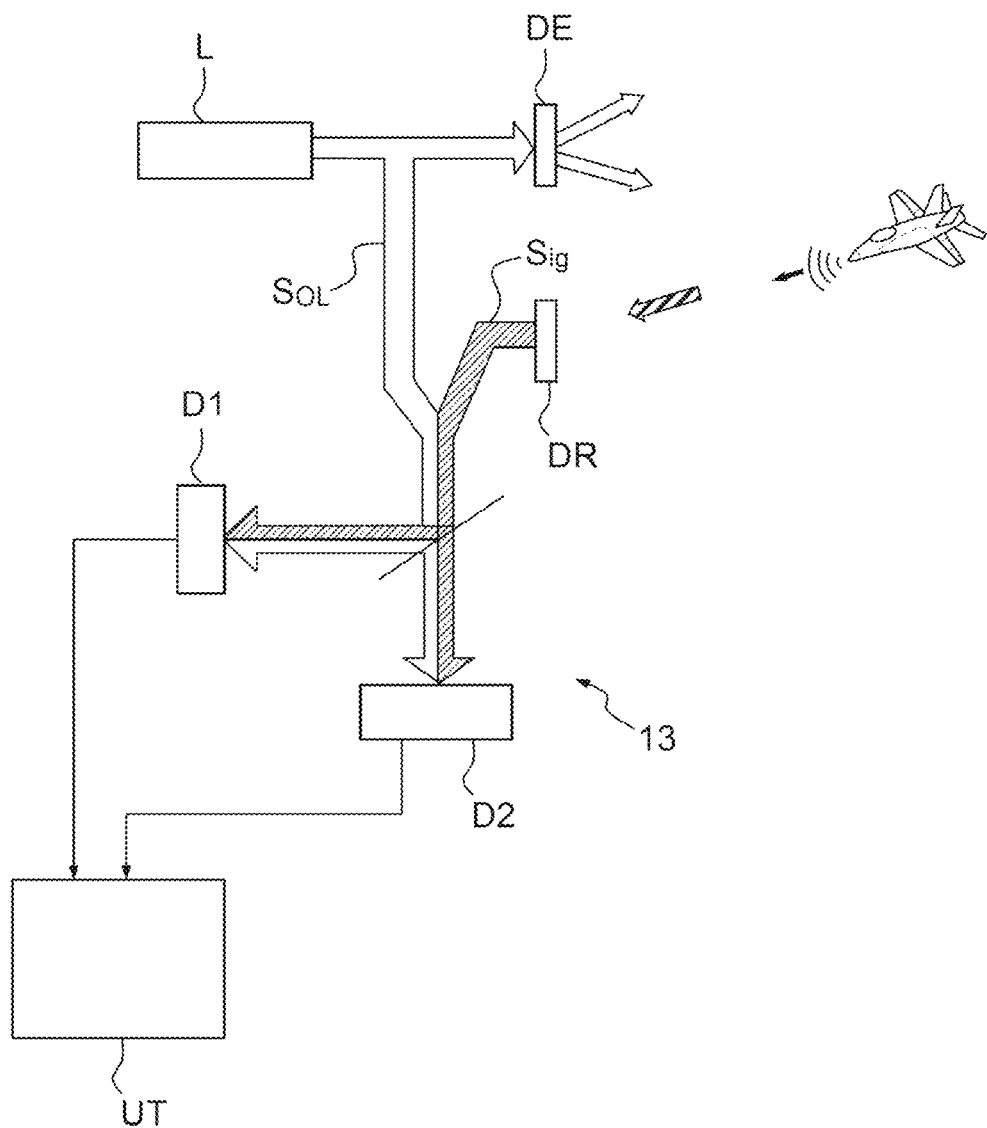
FIG. 14 schematically shows a coherent-lidar system according to the invention.

The invention also relates to a coherent-lidar system 13 (illustrated in FIG. 14) comprising:

a coherent source L, a device DE for emitting an optical signal generated by the coherent source and a device DR for receiving a signal backscattered by a target T illuminated by the lidar, a first detection assembly D1 configured to generate a first beat signal Sb1 generated by interference between a local-oscillator signal $S_{OL}$ generated by the coherent source and the signal Sig backscattered by the target T, a second detection assembly D2 configured to generate a second beat signal Sb2 generated by interference between a local-oscillator signal $S_{OL}$ generated by the coherent source and the signal Sig backscattered by the target T, a processing unit UT configured to digitize the first and second beat signals, and configured to implement the method according to the invention described above, and preferably the variants and embodiments thereof.

Thus, the processing unit UT is configured to:

determine, for a plurality of n time intervals ti, n spectral-density values SPDi corresponding to a transform to the frequency domain of the cross-correlation between the first and second beat signals, and to:

determine an average value <SPD> of the spectral density from the n computed spectral-density values SPDi, and determine target location information from the average value of the spectral density.

It will be understood that the lidar 13 according to the invention comprises optical components or integrated optics allowing the local-oscillator signal and the backscattered signal to the distributed over two channels, in order to direct a fraction of these signals over a first channel to the first detection assembly and another fraction over a second channel to the second detection assembly.

It is preferable to separate the signals with a view to sending them to the detection assemblies D1 and D2 after mixing with the local oscillator so as to guarantee an identical phase shift in the two channels, in particular in the case where the frequency varies over time.

If no particular precaution is taken with respect to the optical architecture for distributing the signals to the detection assemblies D1 and D2, the paths followed by the signals $S_{OL}$ and Sig, from a reference point $P_{REF}$ from which the signals $S_{OL}$ and Sig are recombined and ready to be detected, to reach the first and second detection assembly, respectively, are different. The resulting beat signals Sb1 and Sb2 are then temporally shifted. In the case of a frequency modulation, this shift leads to the amplitude of the peaks obtained during the computation of the Fourier transform of the correlation product to be decreased.

Figure 15:
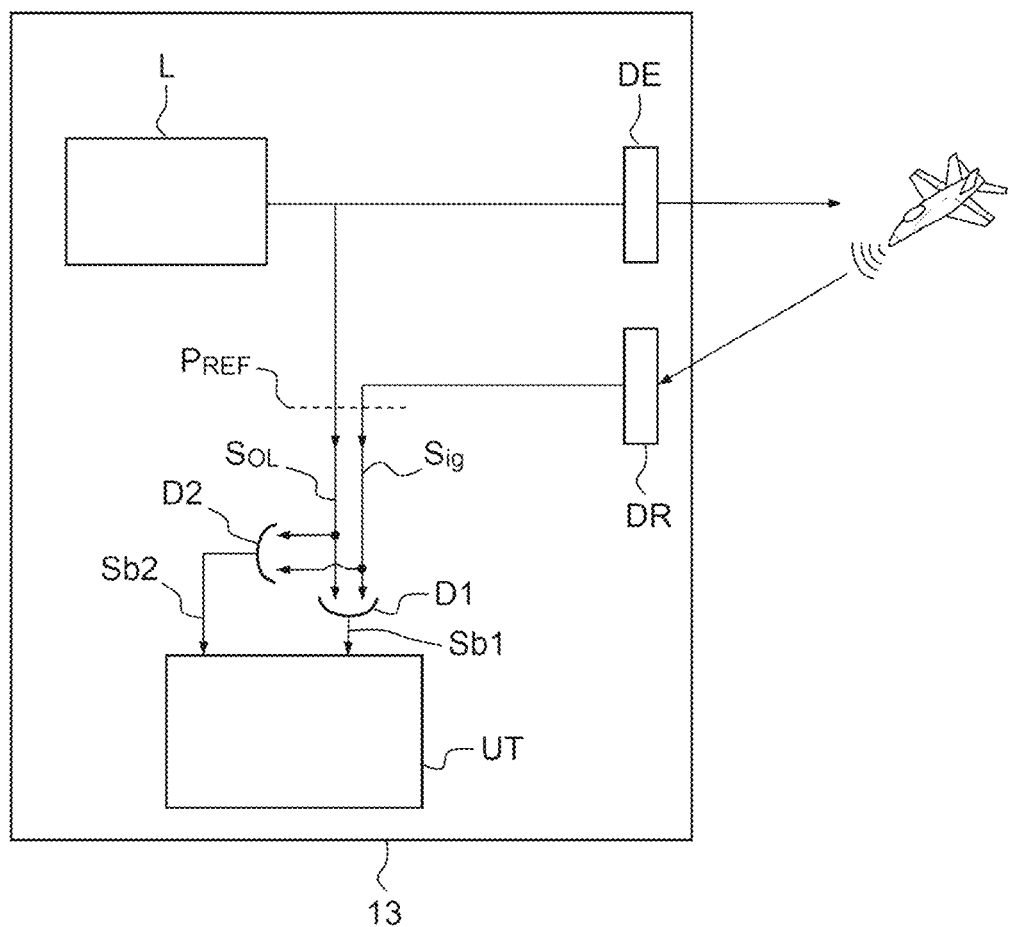
FIG. 15 schematically shows a preferred variant of the coherent-lidar system according to the invention.

To mitigate this drawback, the first detection assembly D1 and the second detection assembly D2 are preferably placed so that the length of the paths followed by each of the detected signals $S_{OL}$ and Sig, from a reference plane or point $P_{REF}$, is substantially equal, such as illustrated in FIG. 15. In this case, the beat signals Sb1 and Sb2 are temporally equal.

$$Sb1(t)=SB2(t)$$

This condition is met exactly if the difference between the paths followed by $S_{OL}$ and Sig to D1 and D2 is very much smaller than the distance that light would travel during a time interval equal to the inverse of the frequency of the beat signal.

For example, for a beat frequency of 100 MHz, corresponding to a period of 10 ns, the paths are preferably very much shorter than 30 cm.

According to one embodiment, the lidar system 13 according to the invention furthermore comprises a modulation device WFC that is synchronized with the processing unit (UT) and that is configured to frequency modulate periodically the coherent source L so that the local-oscillator signal $S_{OL}$ has a local-oscillator frequency $f_{OL}(t)$ consisting of the sum of an average value f0 and of a modulation frequency $f_{mod}(t)$ generated by modulating the source, the modulation frequency being periodic in a modulation period $T_{FO}$, each period of the frequency modulation comprising n linear portions having n frequency slopes αi, respectively, n being higher than or equal to 2.

In this embodiment, the processing unit is furthermore configured so that the time intervals ti are shorter than or equal to the modulation period $T_{FO}$ and to determine information on the distance d of the target from the average value of the spectral density.

Figure 16:
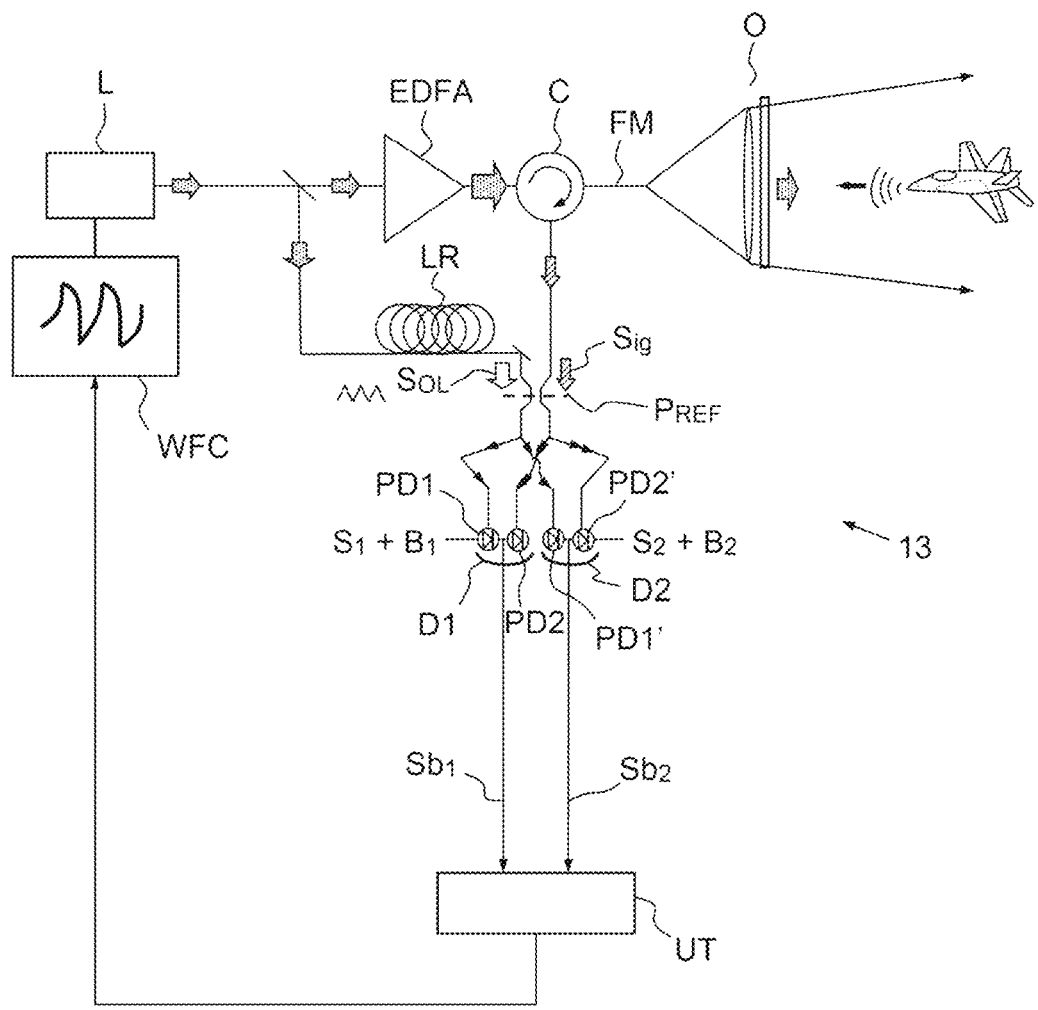
FIG. 16 schematically shows a preferred variant of the coherent-lidar system according to the invention, compatible with a balanced detection.

An example of the optical architecture of such a coherent lidar 13 employing frequency modulation according to the invention is illustrated in FIG. 16.

The lidar 13 according to the invention is compatible with use of the detection assemblies D1 and D2 in a balanced-detection mode. Thus, according to one embodiment also illustrated in FIG. 14, for the nonlimiting case of a lidar employing frequency modulation, the first detection assembly D1 and/or the second detection assembly D2 are balanced detectors each comprising a first detector, PD1 for D1, PD1' for D2, and a second detector, PD2 for D1 and PD2' for D2, which are configured to perform balanced detection.

Thus, the first detectors PD1 and PD1' receive a signal that is proportional to the difference between the local-oscillator signal $S_{OL}$ and the backscattered signal Sig, and the second detectors PD2, PD2' receive a sum of the local-oscillator signal $S_{OL}$ and of the backscattered signal Sig.

In this configuration, the first beat signal Sb1 is generated from the difference between the intensities received by the first detector PD1 and the second detector PD2 of the first detection assembly D1, and the second beat signal Sb2 is generated from the difference between the intensities received by the first detector PD1' and the second detector PD2' of the second detection assembly D2.

Each of the computation modules that the system according to the invention and more particularly the processing unit UT includes may take software and/or hardware form. Each module may in particular consist of a processor and a memory. The processor may be a generic processor, a specific processor, an application-specific integrated circuit (ASIC) or a field-programmable gate array (FPGA).

The invention also relates to a computer program product comprising code instructions allowing the steps of the processing method according to the invention to be performed.

The invention claimed is:

1. A method for processing a signal generated by a coherent lidar comprising a coherent source, the method comprising steps of:
generating a first beat signal and a second beat signal in a first detection assembly and a second detection assembly, respectively, each beat signal being generated by interference between a local-oscillator signal generated by the coherent source and a signal backscattered by a target illuminated by the lidar, then digitizing these beat signals,
for a plurality of n time intervals, determining n respective spectral-density values from a transform to the frequency domain of a cross-correlation between the first and second beat signals,
determining an average value of a spectral density from said n spectral-density values,
determining target location information from the average value of said spectral density.

2. The method as claimed in claim 1, wherein the step of determining n spectral-density values comprises substeps of:
determining a first value of a transform to the frequency domain of the first beat signal,
determining a second value of a conjugate of a transform to the frequency domain of the second beat signal, the spectral-density value being determined from the product of the first and second values.

3. The method as claimed in claim 1, wherein the coherent source is frequency modulated periodically so that the local-oscillator signal has a local-oscillator frequency consisting of the sum of an average value and of a modulation frequency that is generated by modulating the source, the modulation frequency being periodic over a modulation period, and wherein the n time intervals are shorter than or equal to the modulation period, the processing method furthermore comprising a step consisting in determining information on the distance (d) of the target from the average value of the spectral density.

4. The method as claimed in claim 3, wherein each modulation period of the modulation frequency comprises n linear portions having n frequency slopes, respectively, n being higher than or equal to 2.

5. A coherent-lidar system comprising:
- a coherent source,
- a device for emitting an optical signal generated by the coherent source and a device for receiving a signal backscattered by a target illuminated by the lidar,
- a first detection assembly and a second detection assembly, which detection assemblies are configured to generate a first beat signal and a second beat signal, respectively, each beat signal being generated by interference between a local-oscillator signal generated by the coherent source and the signal backscattered by the target,
- a processing unit configured to digitize the first and second beat signals, and configured to determine, for a plurality of n time intervals, n spectral-density values corresponding to a transform to the frequency domain of a cross-correlation between the first and second beat signals,
the processing unit furthermore being configured to:
determine an average value of a spectral density from the n determined spectral-density values, and
determine target location information from the average value of the spectral density.

6. The system as claimed in claim 5, further comprising a modulating device synchronized with the processing unit and configured to frequency modulate periodically the coherent source so that the local-oscillator signal has a local-oscillator frequency consisting of the sum of an average value and of a modulation frequency that is generated by the modulation of the source, the modulation frequency being periodic over a modulation period, each period comprising n linear portions having n frequency slopes, respectively, n being higher than or equal to 2, and
wherein the processing unit is furthermore configured so that the n time intervals are shorter than or equal to the modulation period, and to determine information on the distance of the target from the average value of the spectral density.

7. The system as claimed in claim 5, wherein the first and/or second detection assembly are balanced detectors, each comprising a first detector and a second detector,
the first detectors receiving a difference between the local-oscillator signal and the backscattered signal,
the second detectors receiving a sum of the local-oscillator signal and of the backscattered signal,
the first and second beat signals being generated from the difference between the intensities received by the first detector and the second detector of the first detection assembly and the first detector and second detector of the second detection assembly, respectively.

8. The system as claimed in claim 5, wherein the first and second detection assemblies are placed so that the length of the paths followed by each of the signals to said detection assemblies are substantially equal.

9. A non-transitory processor-readable storage medium, on which is stored a computer program, said computer program comprising code instructions configured to implement the steps of the processing method as claimed in claim 1, when executed by a processor.

* * * * *